G. W. MARTIN.
NUT LOCK.
APPLICATION FILED DEC. 28, 1911.
1,041,832.
Patented Oct. 22, 1912.
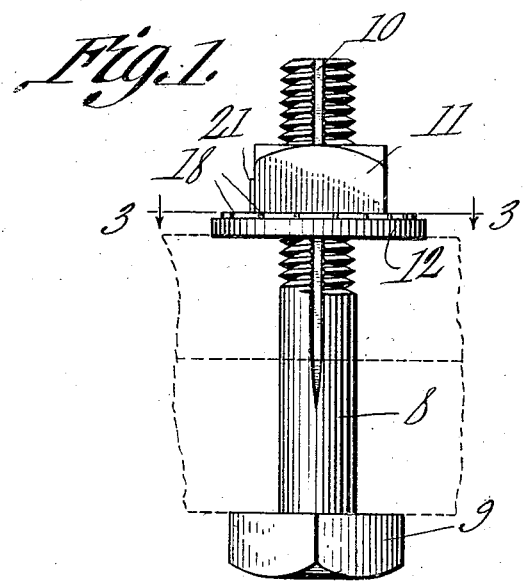
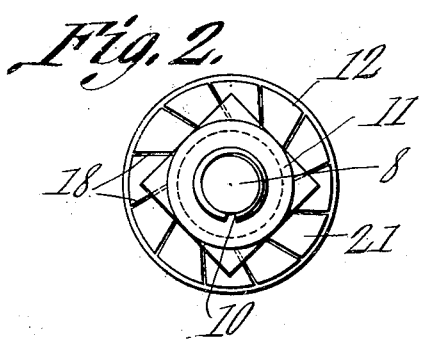
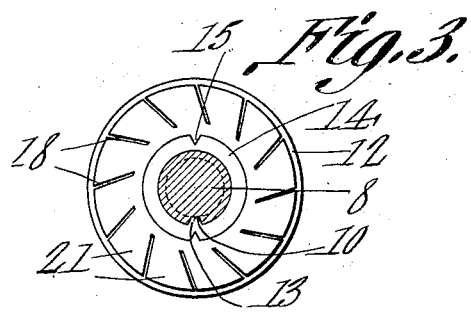
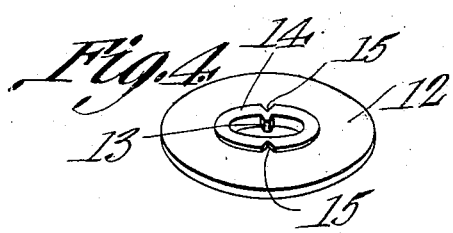
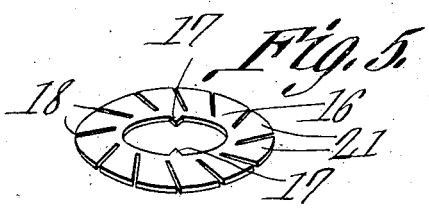
Witnesses
G. W. Martin,
Inventor
by
Attorneys

UNITED STATES PATENT OFFICE.

GEORGE W. MARTIN, OF CHANNING, TEXAS.

NUT-LOCK.

1,041,832.                  Specification of Letters Patent.          Patented Oct. 22, 1912.
Application filed December 28, 1911. Serial No. 668,251.

*To all whom it may concern:*

Be it known that I, GEORGE W. MARTIN, a citizen of the United States, residing at Channing, in the county of Hartley and State of Texas, have invented a new and useful Nut-Lock, of which the following is a specification.

This invention relates to nut locks, and has for its object to provide a washer and a supplemental locking washer coöperating therewith in a novel manner and adapted to be engaged to the nut to prevent the nut from unscrewing.

It is a further object of the present invention to provide a simple, inexpensive, convenient and efficient means for locking a nut upon a bolt.

To the above ends this invention is embodied primarily in a comparatively thick washer having a short boss with notches in its periphery, and a supplemental locking washer of sheet metal on the boss and having projections engaging in the said notches, the supplemental locking washer being of a thickness coincident with the length of the boss to bring the end of the boss flush with the outer face of the washer, and the locking washer having a series of slits cut in the periphery thereof to provide tongues to be bent into engagement with the nut.

This invention is illustrated in the accompanying drawings, wherein similar reference characters illustrate similar parts, and wherein—

Figure 1 is an elevation of an ordinary bolt having a nut thereon with the washers applied thereto. Fig. 2 is an end view of the same. Fig. 3 is a section on the line 3—3 of Fig. 1. Fig. 4 is a perspective view of the washer. Fig. 5 is a perspective view of the supplemental locking washer.

Referring specifically to the drawings, 8 designates a bolt of ordinary form having the head 9 and having a longitudinal groove or channel 10 cut in the periphery thereof, and 11 designates an ordinary square nut screw-threaded upon the bolt.

12 designates a thick washer having a short boss 14 on one of its faces with V-shaped notches 15 in the periphery thereof. The washer 12 has an inwardly projecting lug 13 adapted to engage in the groove or channel 10 of the bolt to constrain the washer 12 against rotation. This washer 12 being thick, is non-flexible and therefore capable of withstanding great stress and not being liable to become worn. A supplementary locking washer 16 of sheet metal is arranged on the boss 14 and has inwardly projecting V-shaped spurs 17 engaging in the notches 15 to constrain the supplementary locking washer against rotation relative to the washer 12. This washer 16 has a series of diagonal slits 18 cut in the periphery thereof to provide tongues 21. The washer 16 being of sheet metal is flexible and the tongues 21 may be bent away from the washer 12 to engage the nut, and the washer 16 is of a thickness coincident with the length of the boss 14 to bring the end of the boss flush with the outer face of the locking washers, whereby the nut 11 upon being brought against the washers bears equally against the end of the boss 14 and the washer 16, the washer 16 being sandwiched between the washer 12 and the nut. The boss 14 is formed by means of an annular raised portion on one face of the washer surrounding the hole of the washer, the notches 15 in the periphery thereof providing a non-circular outline or contour, and the hole of the supplementary washer 16 is of a size or diameter to snugly receive the boss 14, the spurs 17 providing a contour for the opening of the supplementary washer corresponding to the contour or outline of the boss 14.

In use, the washer 12 is engaged on the bolt in the usual fashion, the lug 13 being engaged in the groove or channel 10 to constrain the washer 12 against rotation but permitting the same to move longitudinally on the bolt. The nut 11 in then being screwed on the bolt against the boss 14 of the washer 12 and against the supplementary locking washer 16, may be constrained against rotation by bending one or more of the tongues 21 against the faces thereof, thereby preventing the nut from becoming loosened or unscrewing. The thick washer 12 and the thin or flexible locking washer 16 coöperating therewith provide for a novel combination, the washer 12 withstanding strain and the washer 16 being flexible, permitting the tongues 21 to be readily bent against the nut.

The supplementary washer 16 in being arranged on the boss 14 is kept out of contact with the threads of the bolt, and therefore by bending the tongues 21 into engagement with the nut, the threads of the bolt will not be damaged or injured. By this construction, the locking washer will pass from under the nut on all sides, and will therefore permit the nut to be locked at any position. The washers 12 and 16 may be inexpensively manufactured, and are of comparatively simple construction.

This device is both convenient and efficient in its use, and it is understood that the same is susceptible of slight alterations in its details within the scope of the appended claims without departing from the spirit of the invention.

Having described the invention, what is claimed as new is:

1. A washer adapted to be held non-rotatably on a bolt and having an annular raised portion on one face surrounding the hole of the washer with its periphery non-circular in outline, and a supplementary washer adapted to rest against the said face of the washer, having peripheral portions adapted to be bent into engagement with a nut and having its opening of a size and contour to receive the said raised portion.

2. A thick washer adapted to be held non-rotatably on a bolt and having an annular raised portion on one face surrounding the hole of the washer to form a short boss having notches in its periphery, and a supplementary nut locking washer of sheet metal adapted to rest against the said face of the washer and having its opening adapted to receive the said boss and having spurs projecting from the edges of the said opening engageable in the said notches of the boss, the supplementary washer being of a thickness coincident with the length of the boss to bring the end of the boss flush with the outer face of the washer, and the washer having a series of slits cut in the periphery thereof to provide tongues to be bent into engagement with a nut.

In testimony that I claim the foregoing as my own, I have hereto affixed my signature in the presence of two witnesses.

GEORGE W. MARTIN.

Witnesses:
C. H. HANBURY,
S. M. DOWLEN.

Copies of this patent may be obtained for five cents each, by addressing the "Commissioner of Patents, Washington, D. C."